(12) United States Patent
Jornod et al.

(10) Patent No.: US 10,916,128 B2
(45) Date of Patent: Feb. 9, 2021

(54) METHOD FOR DATA COMMUNICATION BETWEEN AT LEAST TWO PARTICIPANTS OF A WIRELESS COMMUNICATION SYSTEM, CORRESPONDING CONTROL UNIT AND TRANSPORTATION VEHICLE EQUIPPED WITH A CONTROL UNIT, AND COMPUTER PROGRAM

(71) Applicant: VOLKSWAGEN AKTIENGESELLSCHAFT, Wolfsburg (DE)

(72) Inventors: Guillaume Jornod, Berlin (DE); Daniel Reimann, Braunschweig (DE)

(73) Assignee: Volkswagen Aktiengesellschaft

( * ) Notice: Subject to any disclaimer, the term of this patent is extended or adjusted under 35 U.S.C. 154(b) by 0 days.

(21) Appl. No.: 16/680,539

(22) Filed: Nov. 12, 2019

(65) Prior Publication Data

US 2020/0160694 A1    May 21, 2020

(30) Foreign Application Priority Data

Nov. 16, 2018    (EP) .................................... 18206632

(51) Int. Cl.
G08G 1/01    (2006.01)

(52) U.S. Cl.
CPC ......... *G08G 1/0133* (2013.01); *G08G 1/0112* (2013.01); *G08G 1/0141* (2013.01)

(58) Field of Classification Search
CPC ... G08G 1/0112; G08G 1/0141; G08G 1/0133
See application file for complete search history.

(56) References Cited

U.S. PATENT DOCUMENTS

| 2008/0059050 A1* | 3/2008 | Lin | G08G 1/0104 701/117 |
| 2008/0071465 A1* | 3/2008 | Chapman | G01C 21/3691 701/117 |

(Continued)

FOREIGN PATENT DOCUMENTS

| DE | 102015207977 A1 | 11/2016 |
| WO | 2017211868 A1 | 12/2017 |

OTHER PUBLICATIONS

Eckhoff et al.; A Performance Study of Cooperative Awareness in ETSI ITS G5 and IEEE Wave; 10th Annual Conference on Wireless On-Demand Network Systems and Services (WONS); 2013.

(Continued)

*Primary Examiner* — Hongmin Fan
(74) *Attorney, Agent, or Firm* — Barnes & Thornburg LLP

(57) ABSTRACT

A method for data communication between at least two mobile participants of a wireless communication system including observing the surroundings of an observer participant, periodically transmitting data concerning the surroundings observation by the observer participant, determining the amount of relative motion between at least the observer participant and one or more of the participants in the surroundings, and increasing or decreasing the period for sending a repeated transmission of the selected data concerning the surroundings observation by the observer participant based on the result of the determination of the amount of relative motion between at least the observer participant and one or more of the participants in the surroundings.

24 Claims, 5 Drawing Sheets

(56) References Cited

U.S. PATENT DOCUMENTS

| | | | |
|---|---|---|---|
| 2015/0032289 A1* | 1/2015 | Lotz | G08G 1/0112 |
| | | | 701/1 |
| 2015/0312824 A1* | 10/2015 | Thalanany | H04W 60/00 |
| | | | 455/435.1 |
| 2015/0327028 A1 | 11/2015 | Zhang et al. | |
| 2016/0155333 A1 | 6/2016 | Strassberger et al. | |
| 2017/0132929 A1* | 5/2017 | Mays | G08G 1/0141 |
| 2019/0266890 A1* | 8/2019 | Lei | G08G 1/09675 |

OTHER PUBLICATIONS

Ingrachen et al.; A Collaborative Environment Perception Approach for Vehicular Ad hoc Networks; 2018 IEEE 88th Vehicular Technology Conference; Aug. 2018.

Search Report for European Patent Application No. 18206632.4; dated May 16, 2019.

* cited by examiner

METHOD FOR DATA COMMUNICATION BETWEEN AT LEAST TWO PARTICIPANTS OF A WIRELESS COMMUNICATION SYSTEM, CORRESPONDING CONTROL UNIT AND TRANSPORTATION VEHICLE EQUIPPED WITH A CONTROL UNIT, AND COMPUTER PROGRAM

PRIORITY CLAIM

This patent application claims priority to European Patent Application No. 18206632.4, filed 16 Nov. 2018, the disclosure of which is incorporated herein by reference in its entirety.

SUMMARY

Illustrative embodiments relate to an improvement in the vehicle-to-everything communication V2X. More particularly, illustrative embodiments relate to an improvement for exchanging messages in the field of autonomous or cooperative driving. Illustrative embodiments further relate to a corresponding control unit, and a transportation vehicle being equipped with such control unit as well as a corresponding computer program.

BRIEF DESCRIPTION OF THE DRAWINGS

An exemplary embodiment is illustrated in the drawings and is explained in more detail below with reference to the figures, in which.

DETAILED DESCRIPTION

Figure 1:
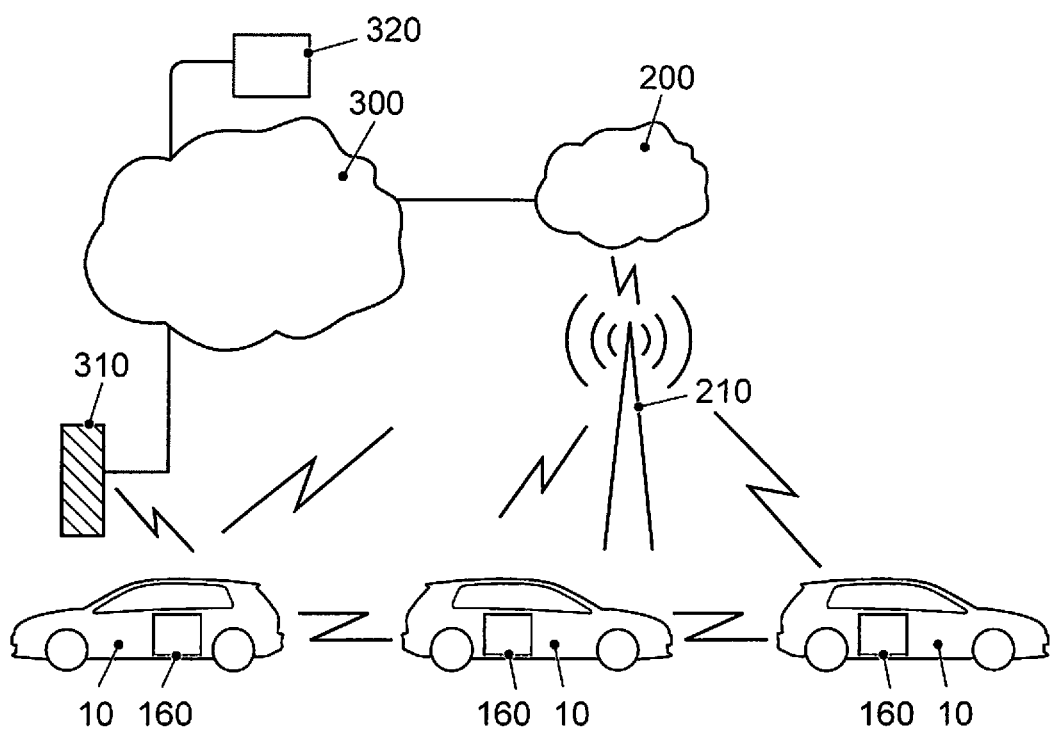
FIG. 1 illustrates the principle of vehicle-to-vehicle communication via mobile radio communication.

Vehicle to everything (V2X) communications is an essential feature of intelligent transportation systems. With wireless communications systems, transportation vehicles are able to share information related to their status and intentions. In these systems, a higher penetration rate of technologies such as ITS-G5 on top of IEEE 802.11p brings additional safety if not comfort.

Autonomous driving (sometimes referred to as automatic driving, automated driving or piloted driving) is the movement of transportation vehicles, mobile robots and driverless transport systems which are largely autonomous. There are different degrees of autonomous driving. In this case, autonomous driving is also spoken at certain levels even if a driver is still present in the transportation vehicle, who possibly only takes over the monitoring of the automatic driving operation. In Europe, the various transport ministries (in Germany, the Federal Institute for Road Systems (Bundesanstalt für Straßenwesen) was involved) worked together and defined the following autonomous stages.

Level 0: "Driver only", the driver drives himself, steers, gives gas, brakes, etc . . . .
Level 1: Certain assistance systems help with transportation vehicle operation (including a cruise control system—Automatic Cruise Control ACC).
Level 2: Partial automation. Therein, automatic parking, tracking function, general longitudinal guidance, acceleration, deceleration, etc. are taken over by the assistance systems (including collision avoidance).
Level 3: High automation. The driver does not have to monitor the system continuously. The transportation vehicle independently performs functions such as the triggering of the turn signal, lane change and tracking. The driver can turn to other things, but if requested, the system is requested to take over the lead within a pre-warning period. This form of autonomy is technically feasible on motorways. Legislators are working to allow Level 3 transportation vehicles. The legal framework has already been created.
Level 4: Full automation. The guidance of the transportation vehicle is permanently adopted by the system. If the system is no longer able to handle the tasks, the driver can be asked to take the lead.
Level 5: No driver required. Apart from setting the target and starting the system, no human intervention is required.

Future cooperative driving applications are envisioned to significantly improve efficiency and comfort of automated driving. Increase in cooperation between transportation vehicles pose specific requirements on communication system and the way messages are exchanged among cooperating transportation vehicles.

Usually any vehicular application inherently assumes an error-prone communication channel and dedicates the task of error minimization to lower layers of the ISO/OSI communication model.

Vehicle to everything (V2X) communications is an essential feature of intelligent transportation systems. With wireless communications systems, transportation vehicles are able to share information related to their status and intentions. In these systems, a higher penetration rate of technologies such as ITS-G5 on top of IEEE 802.11p brings additional safety if not comfort.

For the cooperative or autonomous driving, the exchange of certain messages of the transportation vehicles among each other is very important. Such information included in messages may be position information, surroundings information, trajectory information, warning information, control information and more.

However, this higher penetration rate also brings congestion problems, linked to the shared medium of a common communication technology. This problem is particularly important to consider in situations where a large number of transportation vehicles are involved and where critical situations can occur. A typical example is a traffic jam occupying all available space on one direction of a road and an emergency occurring on the opposite direction, leading to a so-called broadcast storm.

To address this problem of congestion, standards define a set of rules that regulates the sending rates of standardized messages such as cooperative awareness message (CAM) or decentralized environment notification message (DENM). The standard specifying the format of CAM message is ETSI TS 102 637-2 V1.2.1 (2011-03) titled Intelligent Transport Systems (ITS); Vehicular Communications; Basic Set of Applications; Part 2: Specification of Cooperative Awareness Basic Service. The standard specifying the format of DENM messages is ETSI TS 102 637-3 V1.1.1 (2010-09) Intelligent Transport Systems (ITS); Vehicular Communications; Basic Set of Applications; Part 3: Specifications of Decentralized Environmental Notification Basic Service.

At the application layer, a mechanism is based on this set of rules. In regard to CAM messages, this mechanism triggers the sending of an updated CAM message in the following manner:

The current heading of the transportation vehicle differs at least 4° from the heading in the last CAM, or
The current position of the transportation vehicle differs at least 4 m from the position in the last CAM, or
The current speed of the transportation vehicle differs at least 0.5 m/s from the speed in the last CAM, or
The last CAM was sent 1 s earlier.
Similar rules are defined for sending updated DENM messages.

Another lower level mechanism for congestion control is Decentralized Congestion Control (DCC). The corresponding standard is the ETSI standard ETSI TS 102 687 V1.1.1 (2011-07) titled Intelligent Transport Systems (ITS); Decentralized Congestion Control Mechanisms for Intelligent Transport Systems operating in the 5 GHz range; access layer part. In short, the DCC algorithm is based on measurement of the load on the wireless channel. For a high load the DCC algorithm reduces the repetition rate of periodic safety messages.

A paper describing some details to the DCC algorithm, is titled "A Performance Study of Cooperative Awareness in ETSI ITS G5 and IEEE WAVE" of David Eckhoff, Nikoletta Sofray and Reinhard German published in 10th annual conference on wireless on-demand network systems and services (WONS), IEEE 2013.

DE 10 2015 207 977 A1 describes a method for determining relevancy data which represents the importance of that piece of information in terms of traffic safety in a cooperative driving scenario. This solution offers increased flexibility in terms of the information to be transmitted in the event of a communication channel overload. The solution comprises acquisition of an object property of a first road participant and a second road participant. Further it comprises to determine the relevancy of the object property of the second road participant with regard to the object property of the first road participant. Then the solution comprises an operation of selecting and transferring an object property for data communication to other road participants dependent on the relevancy information.

Different problems have been identified with the approaches described above.

A problem with the CAM dissemination algorithm is that the four conditions are all related to the sending transportation vehicle, which is convenient for messages such as CAMs and DENMs as they are informative and centred on the sending transportation vehicles. For systems related to other transportation vehicles such as the cooperative perception message (CPM) (more generally some sensor sharing system), this application layer congestion control algorithm is not sophisticated enough.

There is therefore a need for an improved congestion control algorithm which achieves an even better performance in terms of congestion control taking into account the exchange of perception data from sensors, by CPM messages, for instance. This is important since with CPM messages environment perception data are exchanged which may cause a high load on the V2X/V2V channel such that congestion could easily occur in areas with a lot of traffic.

Disclosed embodiments provide a method for data communication between at least two mobile participants of a wireless communication system, an apparatus for performing the method, a transportation vehicle, and a computer program.

The proposed solution introduces the concept of the consideration of relative changes in the already standardized congestion control system. This uses the fact that the motion of the transportation vehicle itself is not as important as the relative motion of a group of transportation vehicles, especially when they are in a traffic jam situation. In this instance, a transportation vehicle periodically sending its surroundings observation, while it does not relatively change, unnecessarily loads the channel. Similarly, a transportation vehicle driving in a traffic jam along the central has half of its environment relatively immobile while the other part, on the opposite direction, might not be relevant if there is a road separation.

The exchange of sensor raw data cannot be done by exchanging CPM messages with the present standard. It is therefore an idea of this proposal to exchange sensor sharing data in a new category of so called perception sharing messages.

In at least one disclosed embodiment the proposal concerns a method for data communication between at least two mobile participants of a wireless communication system, wherein the method comprises the operations of observing the surroundings of an observer participant and periodically transmitting data concerning the surroundings observation by the observer participant. The method further comprises the operations of determining the amount of relative motion between at least the observer participant and one or more of the participants in the surroundings and increasing or decreasing the period for sending the data concerning the surroundings observation by the observer participant depending on the result of the operation of determining the amount of relative motion between at least the observer participant and one or more of the participants in the surroundings. The adaptation of the period for transmitting surroundings observations to the relative motion between the observer participant and the observed participants in the surroundings has the benefit, that the wireless network will not be overloaded with repeated transmissions of surroundings observation information which is not that relevant due to the traffic situation.

In another disclosed embodiment the environment of the observer participant is subdivided in different zones of interest, wherein the decision of increasing or decreasing the period for sending the data concerning the surroundings observation depends on the determination of the amount of relative motion between at least the observer participant and one or more of the participants in the surroundings in at least a selected one of the different zones of interest. This makes it possible to differentiate between more important areas and less important areas surrounding the observer transportation vehicle for the current traffic situation. It also has the benefit of differentiating zones where the relative motion has a higher probability to change (e.g., opposite lane).

Here, it is beneficial to assign a relative motion threshold to a zone of interest, which determines up to which relative motion between at least the observer participant and one or more of the participants in the zone of interest a reduction of the period for transmitting the data concerning the surroundings observation by the observer participant is feasible respectively from which amount of relative motion on an increase of the period for transmitting the data concerning the surroundings observation by the observer participant is required.

In at least one disclosed embodiment the mobile participants comprise transportation vehicles equipped with wireless communication means, wherein the operation of subdividing the observed environment of the observer participant in zones of interest includes the division of the road on which the observer transportation vehicle is moving into driving lanes to assign different rates of sending perception sharing messages to cope with the probability of changing the relative motions. This disclosed embodiment is well adapted to a typical traffic situation where transportation vehicles are driving on a road comprising a plurality of different lanes. Particularly in a traffic jam situation since the relative motion to the transportation vehicles driving on the same lane is low, the perception sharing message exchange rate with the transportation vehicles driving on the same lane could be reduced for the observer transportation vehicle.

In at least one disclosed embodiment the data concerning the surroundings observation by the observer transportation vehicle concerns the data about one or more of the observed transportation vehicles moving on the same driving lane as the observer transportation vehicle.

In a further disclosed embodiment the period for sending a repeated transmission of the selected data concerning the surroundings observation by the observer participant is increased when the relative motion between the observer transportation vehicle and at least one of the observed transportation vehicles is below a defined limit. If the relative motion is below a limit, e.g., 5 m/s the period for sending observation information about the transportation vehicles driving on the same lane can be increased since the distance between the transportation vehicles driving on the same lane will not change much.

Another situation that leads to useless channel overload is the sharing of updates regarding the perception of a static object. Therefore, in a further disclosed embodiment, the method comprises a operation of determining static objects in the observed environment. Examples of static objects are side walls along the road. The wall should be detected as an immobile object and updates regarding it should be shared at a very low rate.

This is also useful to reduce the update rate regarding the recognition of parked transportation vehicles, which, by definition, will not move. It is therefore an idea to treat parked transportation vehicles as static objects. When the distance between the parked transportation vehicles is below a limit, e.g., less than 1 m, it is a further idea to treat a group of parked transportation vehicles as a wall and apply the same update rules. A maximum gap, between parked transportation vehicles so that they are divided into distinct objects. Like in the previous mentioned embodiments, the method may comprise a operation of increasing the period for sending the data concerning the observation of a static object by the observer participant. Since the object is static, its position won't change and therefore, there is no need to send period updates to this object frequently.

In a disclosed embodiment for direct vehicle-to-vehicle communication V2V the data concerning the surroundings observation by an observer participant is transmitted with a cooperative perception message CPM. If the surroundings observation data concerns sensor data of surroundings observation sensors like camera data, LIDAR sensor data, RADAR sensor data or ultra-sonic or ultra-wideband distance sensor data it may be transmitted in a perception sharing message since CPM messages are standardized and it is not specified that bare sensor data could be transmitted in CPM messages.

For an apparatus for performing operations of the method according to the proposal, it is beneficial that the apparatus comprises surroundings observation sensors and one or more processing unit adapted to perform the operations of the method according to the proposal.

In at least one disclosed embodiment it is beneficial that a transportation vehicle is equipped with an apparatus according to the proposal.

In a further disclosed embodiment it is beneficial if a computer program comprises program operations, which when run in a processing unit carry out a method according to the proposal.

In summary, for the scenario of transportation vehicles moving on public streets on one hand, the proposal takes advantage of reducing the load on the V2V/V2X channel by using relative group changes in an area of interest instead of relative ego changes. On the other hand, the proposal benefits from the large amount of road users in a traffic jam to keep a regular information about objects in other parts of the road. Indeed, a very large amount of very low rate information is similar to a regular rate information from a few road users.

The present description illustrates the principles of the present disclosure. It will thus be appreciated that those skilled in the art will be able to devise various arrangements that, although not explicitly described or shown herein, embody the principles of the disclosure.

All examples and conditional language recited herein are intended for educational purposes to aid the reader in understanding the principles of the disclosure and the concepts contributed to furthering the art, and are to be construed as being without limitation to such specifically recited examples and conditions.

Moreover, all statements herein reciting principles and embodiments of the disclosure, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

Thus, for example, it will be appreciated by those skilled in the art that the diagrams presented herein represent conceptual views of illustrative circuitry embodying the principles of the disclosure.

The functions of the various elements shown in the figures may be provided through the use of dedicated hardware as well as hardware capable of executing software in association with appropriate software. When provided by a processor, the functions may be provided by a single dedicated processor, by a single shared processor, or by a plurality of individual processors, some of which may be shared. Moreover, explicit use of the term "processor" or "controller" should not be construed to refer exclusively to hardware capable of executing software, and may implicitly include, without limitation, digital signal processor (DSP) hardware, read only memory (ROM) for storing software, random access memory (RAM), and non-volatile storage.

Other hardware, conventional and/or custom, may also be included. Similarly, any switches shown in the figures are conceptual only. Their function may be carried out through the operation of program logic, through dedicated logic, through the interaction of program control and dedicated logic, or even manually, the particular technique being selectable by the implementer as more specifically understood from the context.

In the claims hereof, any element expressed as a means for performing a specified function is intended to encompass any way of performing that function including, for example, a) a combination of circuit elements that performs that function or b) software in any form, including, therefore, firmware, microcode or the like, combined with appropriate circuitry for executing that software to perform the function. The disclosure as defined by such claims resides in the fact that the functionalities provided by the various recited means are combined and brought together in the manner which the claims call for. It is thus regarded that any means that can provide those functionalities are equivalent to those shown herein.

FIG. 1 shows the system architecture for the proposal. Reference number 10 denotes a user device. The depicted user device is exemplified as a transportation vehicle and more, in particular, it is a car. In other examples it may be differently exemplified, e.g., a smart phone, a smart watch, a tablet computer, notebook or laptop computer or the like. Shown is a passenger car. If exemplified with a transportation vehicle, it may be any type of a transportation vehicle. Examples of other types of transportation vehicles are: bicycles, motorcycles, commercial transportation vehicles, in particular, trucks, busses, agricultural machinery, construction machinery, rail vehicles, etc. The use of the disclosed embodiments would be generally in land vehicles, rail vehicles, watercrafts and aircrafts possible including robots and drones. The transportation vehicle 10 is equipped with an on-board connectivity module 160 including corresponding antenna such that the transportation vehicle 10 can participate in any form of a mobile communication service. FIG. 1 illustrates that transportation vehicle 10 may transmit and receive signals to and from a base station 210 of a mobile communication service provider.

Such base station 210 may be an eNodeB base station of an LTE (Long Term Evolution) mobile communication service provider. The base station 210 and the corresponding equipment is part of a mobile communication network with a plurality of network cells where each cell is served by one base station 210.

The base station 210 in FIG. 1 is positioned close to a main road on which the transportation vehicle 10 is driving. Of course, other transportation vehicles may also drive on the road. In the terminology of LTE, a mobile terminal corresponds to a user equipment UE, which allows a user to access network services, connecting to the UTRAN or Evolved-UTRAN via the radio interface. Typically, such user equipment corresponds to a smart phone. Of course, mobile terminals are also used in the transportation vehicles 10. The cars 10 are equipped with the on-board connectivity module OCU 160. This OCU corresponds to an LTE or any other communication module with which the transportation vehicle 10 can receive mobile data in downstream direction and can send such data in upstream or in direct device-to-device direction. For the application in transportation vehicles and for the implementation of V2V and V2X communication capability primarily the following technologies will be combined: LTE Cellular Vehicle-to-Everything communication (3GPP Releases 14 and above) which is based on the PC5 interface (also known as sidelink communication at the physical layer) corresponds to the 4G and future 5G mobile communication technology, WLAN p, corresponds to the IEEE 802.11p communication technology. Further technologies which might be used, are BLUETOOTH® communication, ZIGBEE® communication and UWB communication which corresponds to an ultra-wide band communication technology. While UWB, BLUETOOTH® and ZIGBEE® are not specially designed for V2V and V2X communication, they are mentioned here since they have the potential with corresponding adaptation that they could also be used for this purpose. UWB communication technology can be utilized in the cooperative driving application "high density platooning". More detailed information about the use of this communication technique for V2V communication is provided in the article "A Vehicular Ultra-Wideband Channel Model for Future Wireless Intra-Vehicle Communications (IVC) Systems" from Weidong Xiang.

In terms of the LTE mobile communication system, the Evolved UMTS Terrestrial Radio Access Network E-UTRAN of LTE consists of a plurality of eNodeBs, providing the E-UTRA user plane (PDCP/RLC/MAC/PHY) and control plane (RRC) protocol terminations towards the UE. The eNodeBs are interconnected with each other by the so-called X2 interface. The eNodeBs are also connected by the so-called S1 interface to the EPC (Evolved Packet Core) 200, more specifically to the MME (Mobility Management Entity) by the S1-MME and to the Serving Gateway (S-GW) by the S1-U interface.

From this general architecture FIG. 1 shows that eNodeB 210 is connected to the EPC 200 via the S1 interface and that EPC 200 is connected to the Internet 300. The backend server 320 to which the transportation vehicles 10 send messages to and receive messages from is also connected to the Internet 300. In the field of cooperative and autonomous driving the backend server 320 typically is located in a traffic control centre. The S1 interface may be reduced to practice with wireless communication technology such as with the help of microwave radio communication by directional antennas or wired communication technology based on fiber cables. Finally, an infrastructure network component is also shown. This may be exemplified by a road-side unit RSU 310. For the ease of implementation, it is considered that all components have assigned an Internet address, typically as an IPv6 address, such that the packets transporting messages between the components can be routed correspondingly.

The various interfaces of the LTE network architecture are standardized. It is particularly referred to the various LTE specifications, which are publicly available for the sake of sufficiently disclosing further implementation details.

The transportation vehicles in FIG. 1 are each equipped with a communication module 160, which serves as a transmitting and receiving unit for communication in a mobile radio network. This module is sometimes called on-board connectivity unit OCU. The transportation vehicle 10 here corresponds to a mobile radio network subscriber station because of the integrated communication module 160. All messages from the transportation vehicles 10 (uplink) and to the transportation vehicles 10 (downlink) are routed either via a base station 210 which serves a mobile radio cell or, in the case of direct transportation vehicle communication (sidelink), directly between the transportation vehicles 10. If the transportation vehicles 10 are within this mobile radio cell, they are registered or logged in at the base station 210. If they leave the mobile cell, they are handed over to the neighboring cell (handover) and accordingly logged off at the base station 210. The base station 210 also provides access to the Internet so that the transportation vehicles 10 or all other mobile radio subscribers are supplied with Internet data in the mobile radio cell. For this purpose, the base station 210 is connected to the EPC 200 (Evolved Packet Core) via the so-called S1 interface. A backend server 320 is also accessible via the Internet 300 or another wide area network WAN. This may be located in a traffic control centre to which, e.g., some of the position data or trajectory information of the individual transportation vehicles 10 may be reported for central surveillance or coordination.

Such mobile radio technologies are standardized and reference is made here to the corresponding specifications of mobile radio standards. As a modern example of a mobile radio standard, reference is made to the 3GPP initiative and the LTE standard (Long Term Evolution). Many of the related ETSI specifications are currently available in the version 14. The following is mentioned as an example from version 13: ETSI TS 136 213 V13.0.0 (2016-05); Evolved Universal Terrestrial Radio Access (E-UTRA); Physical layer procedures (3GPP TS 36.213 version 13.0.0 Release 13). It also referred to the new 5G mobile communication system which is currently in the standardization process as another example of a mobile radio technology.

For the direct vehicle-to-vehicle communication the technology of the WLAN p communication is currently used for the exchange of CAM, DENM and DCC messages. This technology is also standardized and it is referred to the various specifications of the IEEE 802.11p standard.

The transportation vehicles are also equipped with means for surroundings observation. The sensor system, which is used to capture the environmental objects is based on different measuring methods depending on the application. Widespread technologies are among others Radar corresponding to Radio Detection and Ranging, Lidar corresponding to Light detection and ranging, cameras 2D and 3D and ultrasonic sensors.

Figure 2:
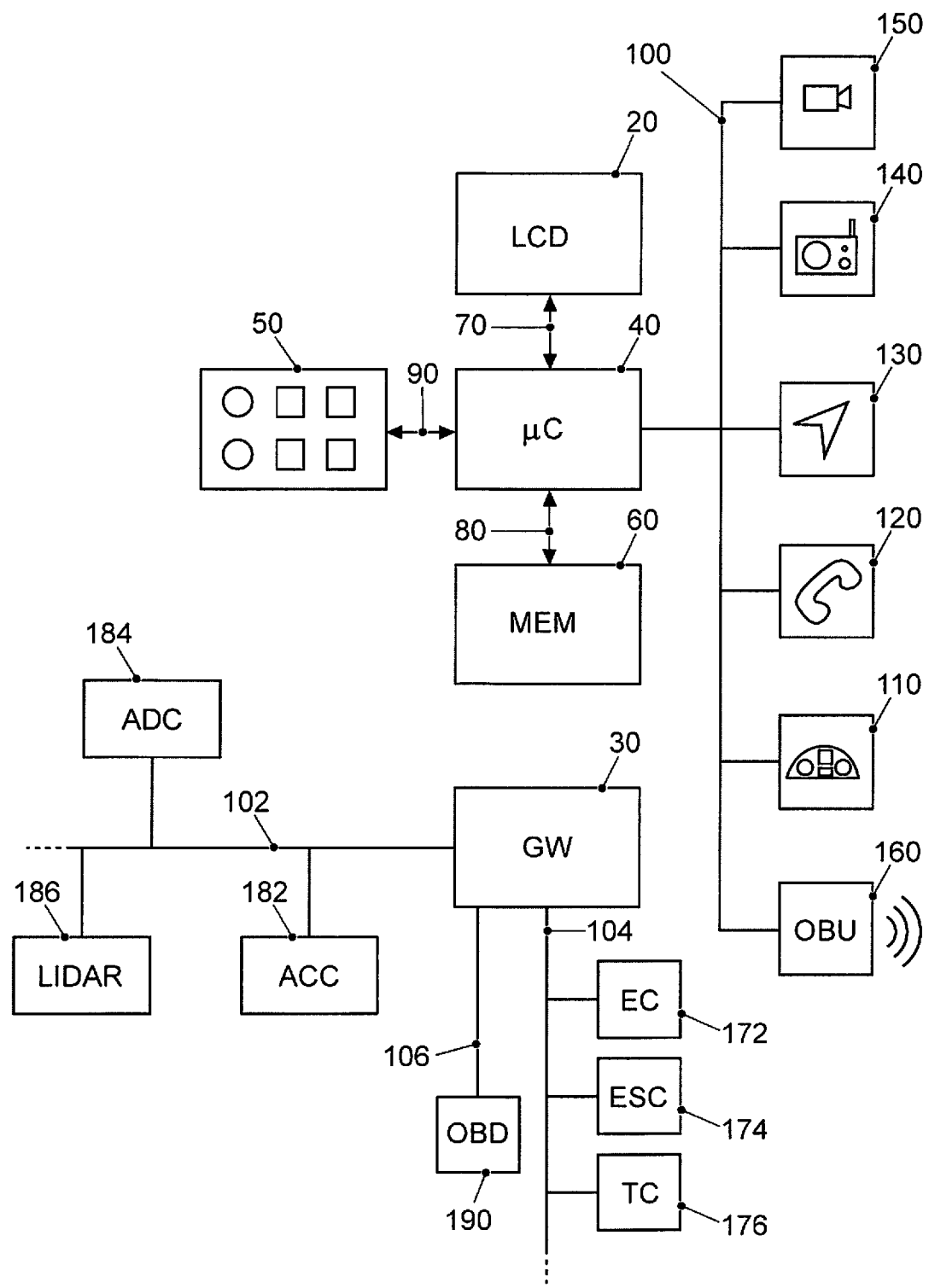
FIG. 2 shows a block diagram for a transportation vehicle communication network with various vehicle electronics components.

FIG. 2 shows schematically a block diagram of the transportation vehicle's 10 board electronics system. Part of the board electronics system is an infotainment system which comprises: the touch-sensitive display unit 20, a computing device 40, an input unit 50, and a memory 60. The display unit 20 includes both a display area for displaying variable graphical information and an operator interface (touch-sensitive layer) arranged above the display area for inputting commands by a user.

The memory device 60 is connected to the computing device 40 via a further data line 80. In the memory 60, a pictogram directory and/or symbol directory is deposited with the pictograms and/or symbols for possible overlays of additional information.

The other parts of the infotainment system such as camera 150, radio 140, navigation device 130, telephone 120 and instrument cluster 110 are connected via the data bus 100 with the computing device 40. As data bus 100 the high-speed option of the CAN bus according to ISO standard 11898-2 may be taken into consideration. Alternatively, for example, the use of an Ethernet-based bus system such as IEEE 802.03cg is another example. Bus systems in which the data transmission via optical fibres happens are also usable. Examples are the MOST Bus (Media Oriented System Transport) or the D2B Bus (Domestic Digital Bus). For inbound and outbound wireless communication, the transportation vehicle 10 is equipped with a communication module 160. This communication module 160 is often referred to as an on-board connectivity module OCU as mentioned above. It can be used for mobile communication, e.g., mobile communication according to the LTE standard, according to Long Term Evolution or the new 5G mobile communication system.

Reference numeral 172 denotes an engine control unit. The reference numeral 174 corresponds to an ESC control unit corresponding to electronic stability control and the reference numeral 176 denotes a transmission control unit. The networking of such control units, all of which are allocated to the category of the drive train, typically occurs with the CAN bus system (controller area network) 104. Since various sensors are installed in the transportation vehicle and these are no longer only connected to individual control units, such sensor data are also distributed via the bus system 104 to the individual control devices.

However, the modern transportation vehicle can also have further components such as further surroundings scanning sensors like a LIDAR (Light Detection and Ranging) sensor 186 or RADAR (Radio Detection and Ranging) sensor and more video cameras, e.g., as a front camera, rear camera or side camera. Such sensors are used more and more in transportation vehicles for surroundings observation. Further control devices, such as an automatic driving control unit ADC 184 and an adaptive cruise control unit ACC 182, etc., may be provided in the transportation vehicle. There may be other systems in the transportation vehicle, too such as the UWB transceivers for inter transportation vehicle distance measurement. The UWB transceivers may typically be used for a short distance observation, e.g., 3 to 10 m. The RADAR and LIDAR sensors could be used for scanning a range up to 250 m or 150 m and the cameras cover a range from 30 to 120 m. The components 182 to 186 are connected to another communication bus 102. The Ethernet-Bus may be a choice for this communication bus 102 due to its higher bandwidth for data transport. One Ethernet-Bus adapted to the special needs of car communication is standardized in the IEEE 802.1Q specification. Moreover, a lot of information for surroundings observation may be received via V2V communication from other road participants. Particularly for those road participants not being in line of sight LOS to the observing transportation vehicle it is very beneficial to receive the information about their position and motion via V2V communication.

Reference number 190 denotes an on-board diagnosis interface.

For the purpose of transmitting the transportation vehicle-relevant sensor data via the communication interface 160 to another transportation vehicle or to a central computer 320, the gateway 30 is provided. This is connected to the different bus systems 100, 102, 104 and 106. The gateway 30 is adapted to convert the data it receives via the one bus the transmission format of the other bus so that it can be distributed in the packets specified there. For the forwarding of this data to the outside, i.e., to another transportation vehicle 10 or to central computer 320, the on-board connectivity unit 160 is equipped with communication interfaces Uu and PC5 to receive these data packets and, in turn, to convert them into the transmission format of the correspondingly used mobile radio standard. The gateway 30 takes all the necessary format conversions if data are to be exchanged between the different bus systems if required.

Under the considered scenario of cooperative or autonomous driving the transportation vehicles broadcast so-called Cooperative Awareness Messages CAM periodically such that they are aware which other transportation vehicles are in the vicinity. Together with its own surroundings observation means, the transportation vehicles are pretty well informed what happens in the near future and thus cooperative or autonomous driving maneuvers may be realized based on this information.

Figure 3:
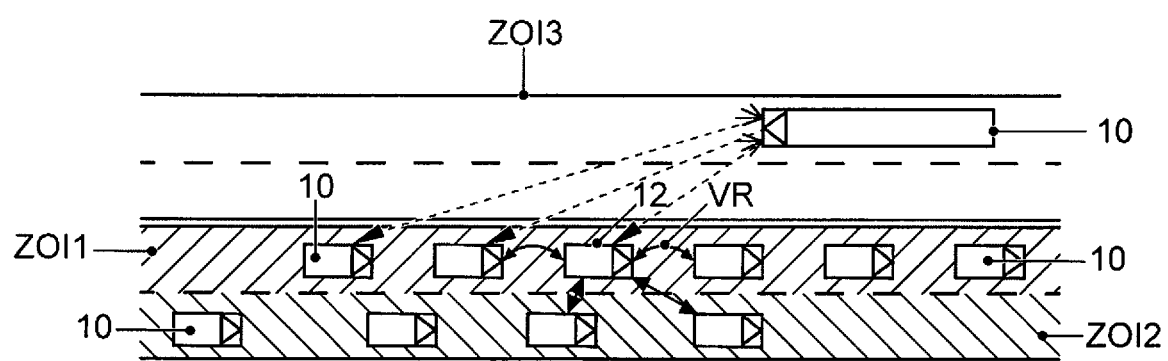
FIG. 3 shows a typical traffic jam situation on a road with two lanes in each direction.

FIG. 3 shows an example of a traffic jam scenario on one side of a motorway with two lanes in each direction. The traffic jam is on the bottom side of the motorway showing a plurality of transportation vehicles 10 moving slowly in the traffic jam from left to right. The transportation vehicle labelled with reference number 12 is considered an observer transportation vehicle observing the surrounding transportation vehicles. On the other side of the road there is just one transportation vehicle 10 depicted moving from right to left. In this case it is a long transportation vehicle, e.g., a truck or a bus. It is noted that also the surrounding transportation vehicles will observe their surrounding when equipped with surrounding observation sensors.

Each observer transportation vehicle 12 will inform the surrounding transportation vehicles 10 about the objects perceived in the surroundings. The exchanged information about the perceived objects may include the position, size, type, motion direction, speed of movement, acceleration, etc. This type of information will be periodically transmitted for safety reasons. In the scenario of a motorway the speed of the transportation vehicles could be very high, therefore it is needed that the information is frequently transmitted to the surrounding transportation vehicles. In a typical traffic jam situation the speed of the transportation vehicles on the side of the road where the traffic jam is located, may be really low up to the case where the transportation vehicles stand still.

Figure 4:
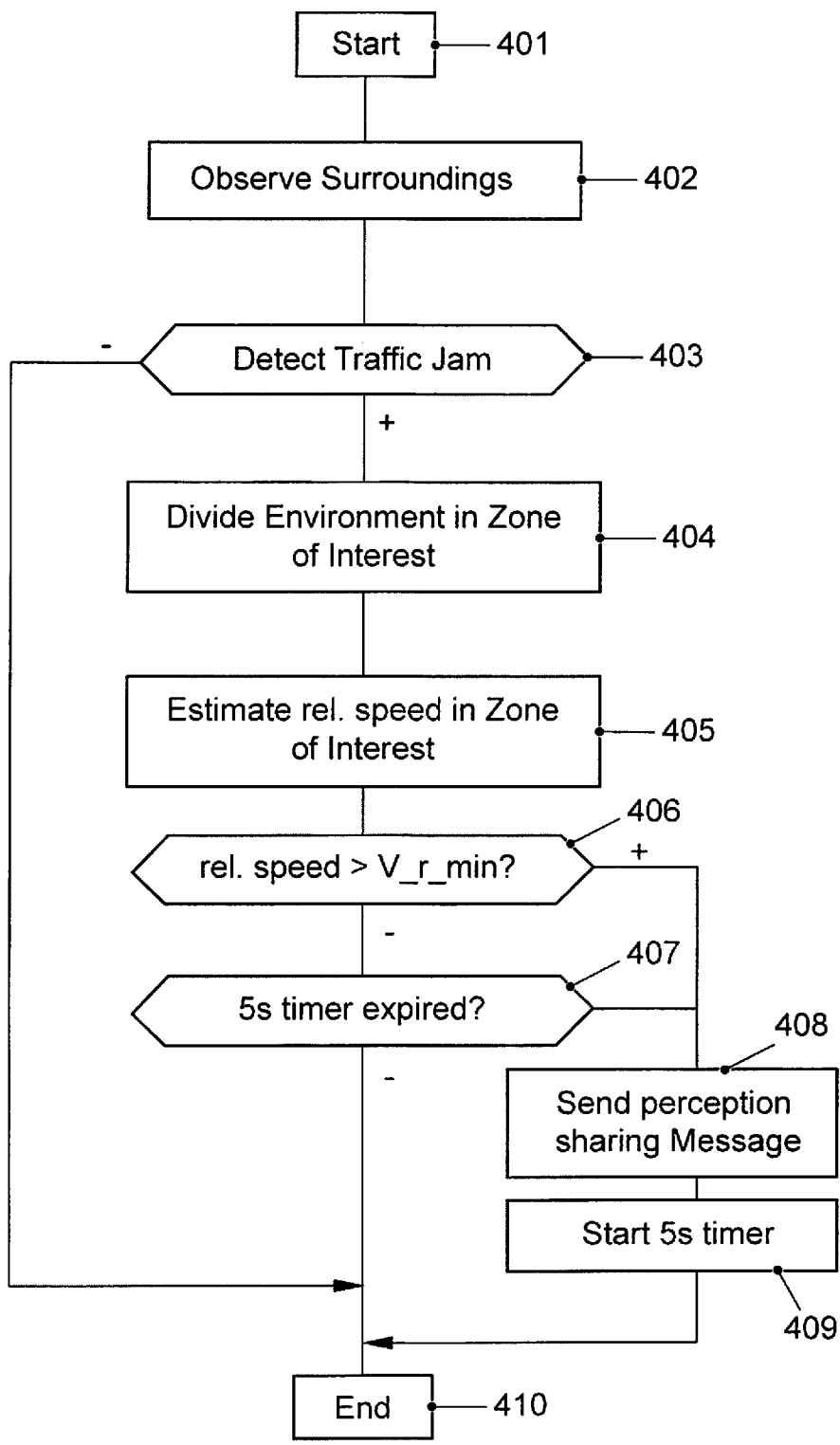
FIG. 4 shows the flow chart of a computer program to be executed in a processing unit of a transportation vehicle with V2V/V2X communication capability in the traffic jam situation.

In that situation the regular exchange of information about the surroundings observations may overload the V2V channel capacity since a great plurality of transportation vehicles is trying to send their observation information. To solve this problem, in at least one disclosed embodiment the following process will be performed for limiting the amount of information exchanged. FIG. 4 shows the example of a flow chart for this process. It is a flow chart for a computer program. The computer program will run on a processing unit. Such processing unit may be a microprocessor or a microcontroller. In at least one disclosed embodiment the processing unit is the microcomputer 40 shown in FIG. 2. In another disclosed embodiment the processing unit is the microprocessor in the on-board connectivity unit 160 shown in FIG. 2. The process starts with program operation at 401. In program operation at 402 the observer transportation vehicle 12 will perform an operation of observing its surroundings with the surroundings observation sensors 150 and 186. This operation may also include the evaluation of the sensor data. For evaluation of the sensor data known techniques of image processing such as filtering, object recognition, motion estimation and the like will be used. In the operation at 403 it will be checked if a traffic jam situation is existing. This could easily be done by checking if a "broadcast storm" has been detected. Such broadcast storm would result when a great plurality of vehicles would exchange their CAM, DENM or CPM messages in a specified time period. An alternative disclosed embodiment for checking out if a traffic jam exists is by evaluating the recorded images captured by the camera 150. Further disclosed embodiments for detecting a traffic jam situation are related with the determination of a low speed of a plurality of transportation vehicles moving in the same direction, low relative motion between the transportation vehicles moving in the same direction, and large number of surrounding transportation vehicles. If there is no traffic jam scenario existing, the program branches to operation at 410 where the program will be ended. In the case the traffic jam scenario was recognized, the following program operation at 404 concerns the subdivision of the surrounding area into zones of interest. In the depicted situation of FIG. 3 there is just the subdivision of the motorway area into three zones ZOI1 to ZOI3. The motorway is divided into different lanes. Reference sign ZOI1 labels the lane on which the observer transportation vehicle 12 is driving. Reference sign ZOI2 labels the other lane of the road side on which the observer transportation vehicle 12 is driving. Reference sign ZOI3 labels the road side on which the transportation vehicles 10 move into the opposite direction of the observer transportation vehicle 12. The reason why the two lanes of the top road side are assigned to one zone ZOI3, is that the two road sides are separated with infrastructure means, e.g., by a wall or a barrier such that the risk of an accident with a transportation vehicle on the other road side is reduced. Therefore, all transportation vehicles 10 on the top road side will be treated in the same category. In operation at 405 the observer transportation vehicle 12 will estimate the relative (absolute) speed of the transportation vehicles 10 moving in zone ZOI1. For performing this operation, the observer transportation vehicle 12 in at least one disclosed embodiment will rely on the information from its own surroundings observation sensors 150, 186. In another disclosed embodiment the observer transportation vehicle 12 will also take into account the observation information received from the surrounding transportation vehicles 10. This could increase the accuracy of the motion estimation in operation at 405. A data fusion technique may be used for this purpose. In operation at 406 it will be checked if the estimated relative speed in zone ZOI1 is above a defined minimum value v_r_min, e.g., 0.5 m/s. Since the relative motion between transportation vehicles can be described with a motion vector, it is mentioned that v_r_min is a threshold value which will be compared with the length of the estimated motion vector that has been determined. In FIG. 3 the relationship between which transportation vehicles this relative speed is determined, is indicated with reference sign VR. If not, it will be checked in query 407 if a timer set to a defined value, e.g., 5 s has expired. If not, the program ends in operation at 410. In all other cases the program branches to program operation at 408 where the sending of an updated perception sharing message with the sensor information about the latest surroundings observation of the observer transportation vehicle is triggered. In operation at 409 the 5 s timer is started anew. The program is periodically called, where the period is determined under the constraints how fast the surroundings sensors could deliver a new surroundings observation. This way a periodic transmission of perception sharing messages with a 5 s period is applied when a traffic jam situation is existing. This reduces subjectively the amount of data exchanged compared to a normal traffic flow situation where CPM messages will be transmitted in a 50 ms interval.

As a consequence there may be different update periods existing in the example of FIG. 3. If the relative speed between the transportation vehicles moving on the bottom side of the road is below v_r_min, the update period will be 5 s. This period will be reduced if the relative speed between the transportation vehicles moving in zone ZOI1 is below v_r_min. For the transportation vehicles moving in zone ZOI3 the same update period of 5 s or another updated period of, e.g., 2 s could be used when they are observed by the surrounding sensors.

Figure 5:
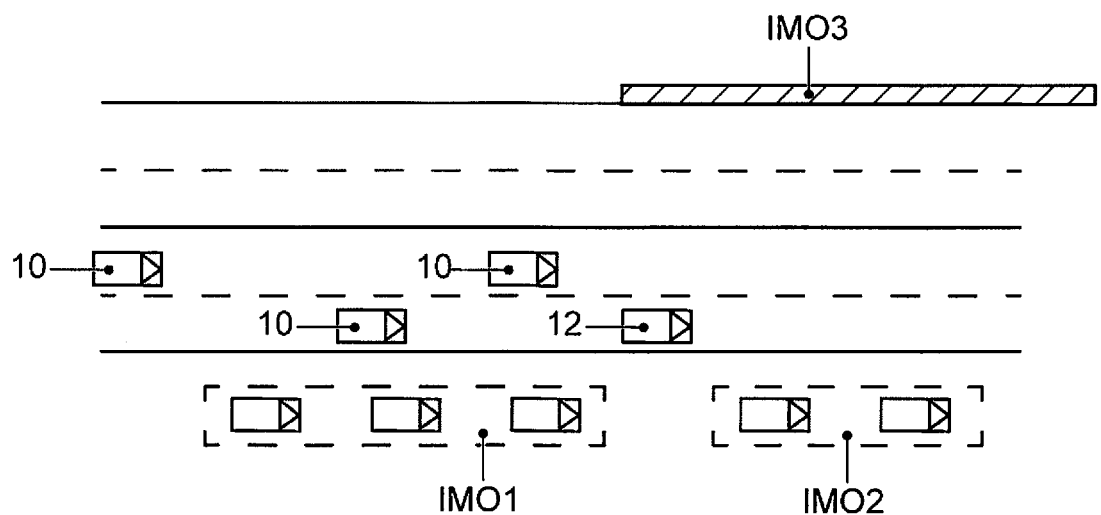
FIG. 5 shows a situation with groups of transportation vehicles moving in one direction on a lane.
Figure 6:
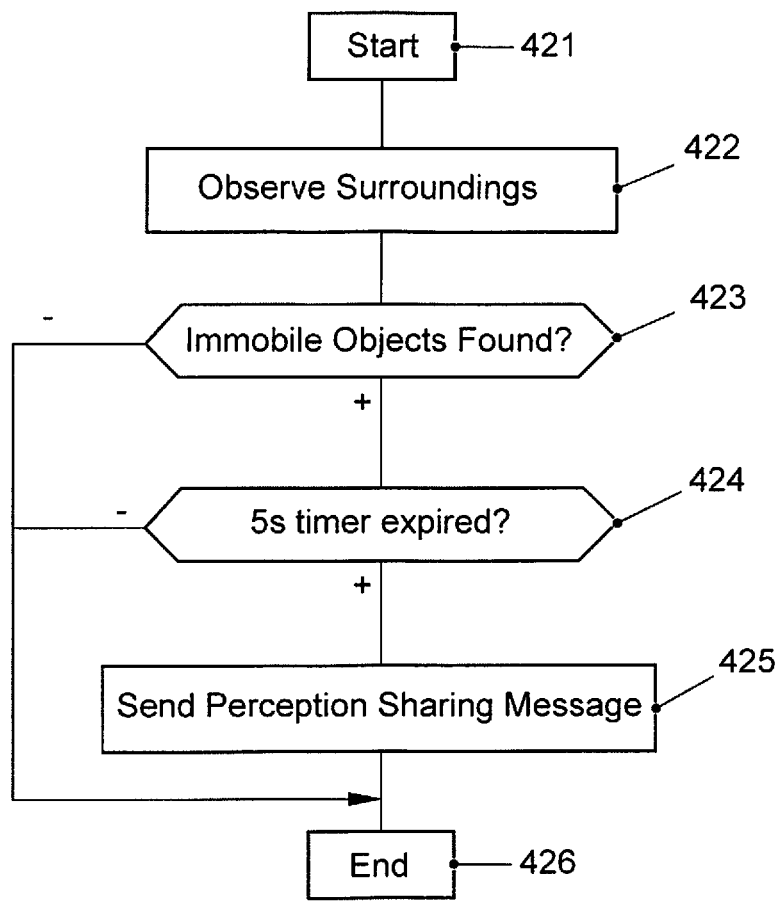
FIG. 6 shows the flow chart of a computer program to be executed in a processing unit of a transportation vehicle with V2V/V2X communication capability in the situation with groups of transportation vehicles moving in one direction on a lane.

FIG. 5 now shows another situation where the period for sending updated CPM messages could be increased. This is when there are static objects detected in the surroundings. One example of a static object is a wall IMO3 at one side of the motorway. Another example are parked transportation vehicles in a dense urban area. Typically in such areas the cars are parked with small distance since there are not enough parking places. FIG. 5 shows two groups of parked cars IMO1 and IMO2 which are parked with small inter-vehicle distance. The process for adapting the period of sending updated CPM messages will be explained with the flow chart of FIG. 6.

Reference number 421 denotes the start of the program. In program operation at 422 the observer transportation vehicle 12 will perform an operation of observing its surroundings. This operation will be performed in a similar manner as in program operation at 402 of FIG. 3. In query 423 it will be checked if immobile objects like walls or densely parked transportation vehicles have been observed. If not, the program ends in operation at 426. If yes, the next operation is query 424 where it will be checked if a 5 s timer has expired. This timer has been started at the instance the last updated CPM message had been transmitted. If this timer has not expired, the program ends in operation at 426. If the timer has expired, in operation at 425 an updated perception sharing message will be transmitted. The 5 s timer will be started anew also in operation at 425. Again, the program is periodically called, under the same constraints as explained in the connection with FIG. 4. This way the 5 s timer will also be applied when static objects have been detected. This program could be used separately in at least one disclosed embodiment. In another disclosed embodiment this program could be used in parallel to the program illustrated with the flow chart in FIG. 4.

In a further disclosed embodiment, this program of FIG. 4 could be modified by adding query 423 between the operations at 406 and 407. If no immobile objects were detected the program ends, if yes, the program branches to the 5 s timer query 408.

It is to be understood that the proposed method and apparatus may be implemented in various forms of hardware, software, firmware, special purpose processors, or a combination thereof. Special purpose processors may include application specific integrated circuits (ASICs), reduced instruction set computers (RISCs) and/or field programmable gate arrays (FPGAs). Optionally, the proposed method and apparatus is implemented as a combination of hardware and software. Moreover, the software may be implemented as an application program tangibly embodied on a program storage device. The application program may be uploaded to, and executed by, a machine comprising any suitable architecture. Optionally, the machine is implemented on a computer platform having hardware such as one or more central processing units (CPU), a random access memory (RAM), and input/output (I/O) interface(s). The computer platform also includes an operating system and microinstruction code. The various processes and functions described herein may either be part of the microinstruction code or part of the application program (or a combination thereof), which is executed via the operating system. In addition, various other peripheral devices may be connected to the computer platform such as an additional data storage device and a printing device.

It should be understood that the elements shown in the figures may be implemented in various forms of hardware, software or combinations thereof. Optionally, these elements are implemented in a combination of hardware and software on one or more appropriately programmed general-purpose devices, which may include a processor, memory and input/output interfaces. Herein, the phrase "coupled" is defined to mean directly connected to or indirectly connected with through one or more intermediate components. Such intermediate components may include both hardware and software based components.

It is to be further understood that, because some of the constituent system components and method operations depicted in the accompanying figures may be implemented in software, the actual connections between the system components (or the process operations) may differ depending upon the manner in which the proposed method and apparatus is programmed Given the teachings herein, one of ordinary skill in the related art will be able to contemplate these and similar implementations or configurations of the proposed method and apparatus.

The disclosure is not restricted to the exemplary embodiments described here. There is scope for many different adaptations and developments which are also considered to belong to the disclosure.

REFERENCE SIGN LIST

10 Observed Transportation Vehicle
12 Observer Transportation Vehicle
20 Touch Screen
30 Gateway
40 Computing Device
50 Operation Element Unit
60 Memory Unit
70 Data Line to Display Unit
80 Data Line to Memory Unit
90 Data Line to Operation Element Unit
100 Data Bus
110 Multifunction Display
120 Telephone
130 Navigation System
140 Radio
150 Camera
160 On-Board Connectivity Unit
200 Evolved Packet Core
210 Base Station
300 Internet
310 Road Side Unit
320 Backend Server
401-410 Program Operations of $1^{st}$ Computer Program
421-426 Program Operations of $2^{nd}$ Computer Program
ZOI1 $1^{st}$ Zone of Interest
ZOI2 $2^{nd}$ Zone of Interest
ZOI3 $3^{rd}$ Zone of Interest
VR relationship between transportation vehicles in zone ZOI1
IMO1 $1^{st}$ Immobile Object
IMO2 $2^{nd}$ Immobile Object
IMO3 $3^{rd}$ Immobile Object

The invention claimed is:

1. An apparatus of an observer transportation vehicle, the apparatus comprising:
sensors for observing surroundings of the observer transportation vehicles; and
a processing unit configured to:
receive, from the sensors, data indicating the surroundings of the observer transportation vehicle, wherein the data indicates that a plurality of other transportation vehicles are present in the surroundings of the observer transportation vehicle and that at least one of the plurality of other transportation vehicles is moving in a same direction as the observer transportation vehicle,
periodically transmit, at a first transmission period, the data from the observer transportation vehicle,
determine whether the observer transportation vehicle is driving in a traffic jam of based on a speed of the at least one of the plurality of other transportation vehicles moving in the same direction as the observer transportation vehicle, in response to the observer transportation vehicle driving in the traffic jam, determine an amount of relative motion between the observer transportation vehicle and the at least one of the plurality of other transportation vehicles moving in the same direction, and in response to the amount of relative motion being less than a relative motion threshold, initiate transmitting the data by the observer transportation vehicle at a second transmission period, wherein the second transmission period is greater than the first transmission period.

2. The apparatus of claim 1, wherein the processing unit is further configured to subdivide the surroundings into a plurality of zones of interest, and wherein amount of relative motion is between the observer transportation vehicle and those of the plurality of other transportation vehicles located within a selected one of the plurality of zones of interest.

3. The apparatus of claim 2, wherein each of the plurality of zones of interest includes a corresponding relative motion threshold different from one another.

4. The apparatus of claim 2, wherein at least one of the plurality of other transportation vehicles comprises wireless communication equipment wherein the subdividing the surroundings of the observer transportation vehicle includes of dividing a road on which the observer transportation vehicle is moving into driving lanes, wherein at least one of the driving lanes is a driving lane in which the observer transportation vehicle is moving, and wherein the relative motion threshold corresponding to the at least one of the driving lanes on which the observer transportation vehicle is moving gets the lowest relative motion threshold.

5. The apparatus of claim 4, wherein the selected data concerning the surroundings observation by the observer transportation vehicle concerns the data about the one or more observed transportation vehicles moving on the same driving road as the observer transportation vehicle.

6. The apparatus of claim 5, wherein the period for sending a repeated transmission of the selected data concerning the surroundings observation by the observer transportation vehicle is increased when the relative motion between the observer transportation vehicle and at least one of the observed transportation vehicles is below a defined limit.

7. The apparatus of claim 2, wherein the processing units is further configured to determine static objects in the observed environment.

8. The apparatus of claim 7, wherein the processing units is further configured to increase the period for sending a repeated transmission of the selected data concerning the observation of a static object by the observer transportation vehicle.

9. The apparatus of claim 2, wherein the processing units is further configured to define a static object for a group of parked transportation vehicles which have been observed by the observer transportation vehicle.

10. The apparatus of claim 9, wherein defining a static object for a group of parked transportation vehicles comprises checking whether the distance between the transportation vehicles of the group of parked transportation vehicles is below a defined limit.

11. The apparatus of claim 2, wherein the selected data concerning the surroundings observation by an observer transportation vehicle is transmitted with a perception sharing message.

12. A transportation vehicle wherein the observer transportation vehicle is equipped with an apparatus according to claim 1.

13. A method for an observer transportation vehicle, the method comprising:

collecting data by observing surroundings of the observer transportation vehicle, wherein the data indicates that a plurality of other transportation vehicles are present in the surroundings of the observer transportation vehicle and that at least one of the plurality of other transportation vehicles is moving in a same direction as the observer transportation vehicle;

periodically transmitting, at a first transmission period, the data indicative of the surroundings by the observer transportation vehicle;

determining whether the observer transportation vehicle is driving in a traffic jam based on a speed of the at least one of the plurality of other transportation vehicles moving in the same direction as the observer transportation vehicle;

in response to the observer transportation vehicle driving in the traffic jam, determining an amount of relative motion between the observer transportation vehicle and the at least one of the plurality of other transportation vehicles moving in the same direction; and in response to the amount of relative motion being less than a relative motion threshold, initiating transmitting the data by the observer transportation vehicle at a second transmission period, wherein the second transmission period is greater than the first transmission period.

14. The method of claim 13, further comprising subdividing the surroundings into a plurality of zones of interest, and wherein the amount of relative motion is between the observer transportation vehicle and those of the plurality of the other transportation vehicles located within a selected one of the plurality of zones of interest.

15. The method of claim 13, wherein each of the plurality of zones of interest includes a corresponding relative motion threshold different from one another.

16. The method of claim 13, wherein at least one of the plurality of other transportation vehicles comprises wireless communication equipment, wherein the subdividing the surroundings of the observer transportation vehicle includes dividing a road on which the observer transportation vehicle is moving into driving lanes, wherein at least one of the driving lanes is a driving lane in which the observer transportation vehicle is moving, and wherein the relative motion threshold corresponding to the at least one of the driving lanes on which the observer transportation vehicle is moving gets the lowest relative motion threshold.

17. The method of claim 16, wherein the selected data concerning the surroundings observation by the observer transportation vehicle concerns the data about the one or more observed transportation vehicles moving on the same driving road as the observer transportation vehicle.

18. The method of claim 17, wherein the period for sending a repeated transmission of the selected data concerning the surroundings observation by the observer transportation vehicle is increased when the relative motion between the observer transportation vehicle and at least one of the observed transportation vehicles is below a defined limit.

19. The method of claim 13, further comprising determining static objects in the observed environment.

20. The method of claim 19, further comprising increasing the period for sending a repeated transmission of the selected data concerning the observation of a static object by the observer transportation vehicle.

21. The method of claim 20, further comprising defining a static object for a group of parked transportation vehicles which have been observed by the observer transportation vehicle.

22. The method of claim 21, wherein defining a static object for a group of parked transportation vehicles comprises checking whether the distance between the transportation vehicles of the group of parked transportation vehicles is below a defined limit.

23. The method of claim 13, wherein the selected data concerning the surroundings observation by an observer transportation vehicle is transmitted with a perception sharing message.

24. A computer program comprising program operations which, when run in a processing unit, carry out a method for an observer transportation vehicle, the method comprising;
    collecting data by observing surroundings of the observer transportation vehicle, wherein the data indicates that a plurality of other transportation vehicles are present in the surroundings of the observer transportation vehicle and that at least one of the plurality of other transportation vehicles is moving in a same direction as the observer transportation vehicle; and
    periodically transmitting, at a first transmission period, the data indicative of the surroundings by the observer transportation vehicle;
    determining whether the observer transportation vehicle is driving in a traffic jam based on a speed of the at least one of the plurality of surrounding participant other transportation vehicles moving in the same direction as the observer transportation vehicle;
    in response to the observer transportation vehicle driving in the traffic jam, determining an amount of relative motion between the observer transportation vehicle and the at least one of the plurality of other transportation vehicles moving in the same direction; and
    in response to the amount of relative motion being less than a relative motion threshold, initiating transmitting the data by the observer transportation vehicle at a second transmission period, wherein the second transmission period is greater than the first transmission period.

* * * * *